US006592984B1

(12) United States Patent
Matsuda et al.

(10) Patent No.: US 6,592,984 B1
(45) Date of Patent: Jul. 15, 2003

(54) ELECTROPHOTOGRAPHIC TRANSFER PAPER

(75) Inventors: Tsukasa Matsuda, Ebina (JP); Kunio Sakurai, Ebina (JP); Tsutomu Kurihara, Ebina (JP); Masaru Kato, Tokyo (JP); Harumi Watanabe, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1137 days.

(21) Appl. No.: 08/573,487

(22) Filed: Dec. 15, 1995

(30) Foreign Application Priority Data

Dec. 20, 1994 (JP) ............................................ 6-316230

(51) Int. Cl.[7] ................................................ B32B 5/16
(52) U.S. Cl. ....................................... 428/326; 428/332
(58) Field of Search ................................. 428/326, 332

(56) References Cited

U.S. PATENT DOCUMENTS

| | | | | |
|---|---|---|---|---|
| 4,074,000 A | | 2/1978 | Hankee et al. | 427/323 |
| 4,332,851 A | * | 6/1982 | Hosomura et al. | 428/325 |
| 4,778,711 A | | 10/1988 | Hosomura et al. | 427/211 |
| 5,145,749 A | | 9/1992 | Matthew | 420/511 |

FOREIGN PATENT DOCUMENTS

| | | |
|---|---|---|
| EP | A-0 367 231 | 5/1990 |
| EP | A-0 524 635 | 1/1993 |
| JP | A-3-294600 | 12/1991 |
| JP | A-5-241366 | 9/1993 |

* cited by examiner

*Primary Examiner*—Robert Dawson
(74) *Attorney, Agent, or Firm*—Oliff & Berridge, PLC

(57) ABSTRACT

Electrophotographic transfer paper comprising base paper having provided on at least one side thereof a coating layer mainly comprising a pigment and a binder at a solids content of 2 to 12 g/m$^2$, which has an Oken's smoothness of 60 to 300 seconds on each side thereof, an air permeability of 10 to 90 seconds, and a coefficient of paper-to-paper friction of 0.5 to 0.9 at 28° C. and 85% RH. The transfer paper has excellent running properties on a digital full-color copying machine or printer of indirect dry electrophotographic system irrespective of the environment of use, especially in a high humidity environment, while proving a satisfactory image.

9 Claims, 3 Drawing Sheets

ELECTROPHOTOGRAPHIC TRANSFER PAPER

BACKGROUND OF THE INVENTION

1. Field of the Invention

The present invention relates to electrophotographic transfer paper having excellent running properties when used in a high temperature and high humidity environment on full-color or monochromatic copying machines and printers using an indirect dry electrophotographic system.

2. Description of the Related Art

Accompanying with the development of color copying machines and printers as well as digitalization of these systems, high definition of an electrophotographic copying machine and printers have been investigating. In particular, digitalization of input/output information has advanced for obtaining a high quality image with a full-color electrophotographic copying machine or printer and brought about great improvements in image input, image processing, development, transfer, fixing, and the like. Developers and photoreceptors have also been improved in conformity with the tendencies of digitalization, high definition, and high color development recording.

Conventional transfer paper which has been used in monochromatic copying machines and printers according to an indirect dry electrophotographic system is not suitable for use in the above-mentioned advanced electrophotographic full-color copying machines or printers. That is, a color image formed on the conventional transfer paper suffers from unevenness of gloss or density, and transfer deficiency occurs. In order to overcome these problems, various types of coated paper have been proposed, e.g., in Unexamined Japanese Patent Publication Nos. Sho-62-198876, Sho-62-198877, Hei-3-242654, Hei-3-294600, and Hei-4-291351.

A coating layer provided for improvement of image quality causes slip on a feed roll due to its smoothness or running troubles due to lack of stiffness (bulkiness). These disadvantages can be eliminated by controlling the characteristics of base paper, using a non-film-forming resin as a coating layer, and controlling the characteristics of transfer paper so that the final product may have an air permeability of 4000 seconds or less and a water content of 4 to 6% thereby to improve both image quality and running properties, as described in Unexamined Japanese Patent Publication No. Hei-5-241366.

Although various studies have been directed to improvement in image quality of coated transfer paper, sufficient study has not been given to running properties of coated transfer paper, still less the running properties in a high temperature and high humidity condition or a low temperature and low humidity condition.

It has turned out that the coated transfer paper, though satisfactory in an ordinary environment, involves great and hitherto unknown problems in terms of running properties with change of the environment of use.

The coated transfer paper has no problem under a normal environment condition. However, under a high temperature/humidity condition, if package is opened on use and the transfer paper taken out is set on a paper feed tray so as to be fed into a machine, multiple feed in which two or more sheets of paper are fed at one time or miss-feeding in which no paper is fed occurs frequently from the just beginning of copying or printing. It has been recognized that the coated transfer paper has a large problem regarding to the running properties which was not known conventionally. Further, under a low temperature/humidity condition, even if paper is fed normally, the paper may stop in the machine on its running way. Accordingly, various problems occur accompanying with change of using environment of paper.

SUMMARY OF THE INVENTION

It is an object of the present invention to provide electrophotographic transfer paper which has a good image quality and an excellent running property particularly under high humidity condition, even when it is used on a full-color or monochromatic copying machine or printer.

Electrophotographic transfer paper is comprised of base paper and a coating layer including a pigment and a binder, said coating layer being provided on at least one side of said base paper; wherein said transfer paper has an air permeability in a range of 10 to 90 seconds, as measured according to JIS P8117 after the pretreatment specified in JIS P8111, and a coefficient of paper-to-paper friction in a range of 0.5 to 0.9 at 28° C. and 85% RH.

Accordingly, the present invention provides transfer paper for electrophotography which exhibits satisfactory running properties on full-color or monochromatic recording equipment of indirect electrophotographic system irrespective of the environment of use and provides a satisfactory image.

DETAILED DESCRIPTION OF THE INVENTION

Figure 1:
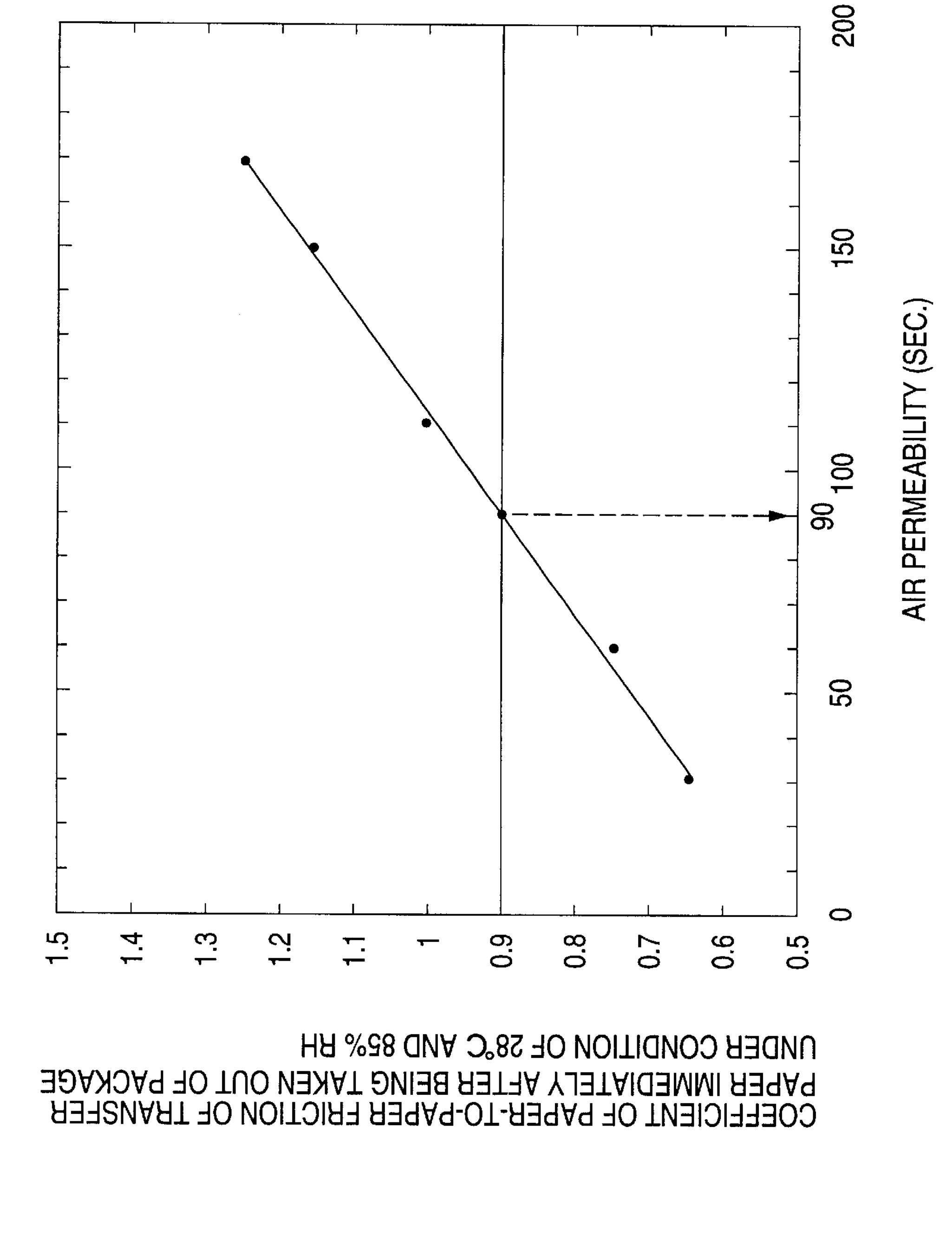
FIG. 1 is a graph showing the relationship between air permeability and coefficient of paper-to-paper friction of transfer paper immediately after being taken out of the package under conditions of 28° C. and 85% RH.

The detailed description of the present invention will be described referring to the accompanying drawings as follows.

The inventors of the present invention have investigated the causes of multiple feed or miss feed of coated transfer paper in a high humidity environment. With respect to multiple feed, it is known that the important factor is not the absolute coefficient of friction but the mode of variation of coefficient of friction among successive sheets of paper (Kami Pulp Gikyoshi, Vol. 44, No. 4 (1990) and M.R Joho Sangyo Series No. 2—Joho Sangyo to Yoshi, Tokushuyakuhinshijo no Genjo to Tenbo I, CMI Shuppan). The inventors measured the variations of coefficient of paper-to-paper friction in a high humidity environment (28° C., 85% RH). The results reveal that general coated paper for printing shows a coefficient of paper-to-paper friction largely scattering from 0 to 0.7 and is therefore extremely liable to multiple feed.

As for miss-feed, on the other hand, the inventors assume the absolute coefficient of friction to be important because miss-feed is considered to occur when the coefficient of roll-to-paper friction (μrp) between a paper feed roll and a sheet of paper in contact with the roll is lower than the coefficient of paper-to-paper friction (μpp) (i.e., μrp<μpp). Based on this assumption, the inventors tested various types of paper on copying machines having a paper feed mechanism of friction retarded pad system, friction retarded roll system and active regarded roll system to confirm the relationship between occurrence of miss-feed and an absolute coefficient of paper-to-paper friction. As a result, it is proved that miss-feed occurs if the absolute coefficient of paper-to-paper friction is 1.0 or higher. It has thus been ascertained that miss-feed of transfer paper can be prevented by controlling that value not to exceed 1.0, desirably not to exceed 0.9. In order to assure satisfactory running properties in a high humidity environment (28° C., 85% RH), the absolute coefficient of paper-to-paper. friction should be from 0.5 to 0.9 with its variation being controlled within 0 to 0.1, taking the paper feeding capacity of a paper feed mechanism into consideration.

Further, even those kinds of transfer paper which causes running troubles such as multiple feed and miss-feed at 28° C. and 85% RH do not cause such running troubles in an ordinary environment (20° C., 65% RH). When these kinds of paper are subjected to thorough moisture conditioning, they maintain a very satisfactory level of absolute coefficient of paper-to-paper friction and it variation, and do not suffer running troubles even in the high humidity condition. From these observations, inventors assume that the following mechanism accounts for the variation of frictional characteristics which occurs immediately after opening the package in a high humidity condition.

Transfer paper is usually packaged so as not to take up moisture in the air. Once it is exposed to open air in a high humidity environment, water vapor enters the gaps among a number of sheets of paper and adhered onto the surface of paper due to the difference in equilibrium water content between the open air and the paper, and the sheets adhere to each other through the surface tension of water. As a result, the absolute coefficient of paper-to-paper friction increases and also largely varies among pairs of sheets of paper depending on the degree of water invasion.

Hence, the inventors investigated the surface characteristics and air permeability of paper which would accelerate uptake of the moisture adhered to the surface into the inside of paper. As a result, it has been found that paper having an air permeability of not more than 90 seconds has satisfactory absolute coefficient of paper-to-paper friction with its variation being controlled within a satisfactory range as shown in FIG. 1. In order for the paper to have an air permeability of not more than 90 seconds, it is effective to control the coating weight to 12 $g/m^2$ or less. However, the air permeability should not be less 10 seconds, and the coating weight should not be less than 2 $g/m^2$. Otherwise, the surface smoothness of the transfer paper is reduced, and the image quality is deteriorated.

With respect to particle size of calcium carbonate which is usually used in the coating layer of coated transfer paper for obtaining improved color image quality, the inventors have ascertained that an average particle size of 1.5 to 8.0 μm is effective to assure satisfactory image quality. If the average particle size of calcium carbonate is smaller than 1.5 μm, the image graininess is deteriorated. If it exceeds 8.0 μm, mottles (density unevenness appearing in specks) become conspicuous.

Even with the coefficient of paper-to-paper friction in a high humidity environment controlled within the above range, the absolute coefficient of paper-to-paper friction increased in an ordinary environment (20° C., 65% RH) so that miss-feed occurred. In order to maintain satisfactory running properties at 20° C. and 65% RH, it is necessary that the paper immediately after being taken out of the package should have an absolute coefficient of paper-to-paper friction of from 0.4 to 0.8.

The difference in a desired range of absolute coefficient of paper-to-paper friction depending on the environmental conditions is ascribed to the fact that paper feeding performance somewhat changes with the environmental change because the paper feed mechanism of copying machines uses members made of rubber, such as Norsolex and EPDM.

The inventors have continued further investigation in order to maintain the above-specified paper-to-paper friction of transfer paper immediately after being taken out of the package under each of conditions of 28° C., 85% RH and 20° C., 65% RH.

First of all, they tested running properties using coated transfer paper in which the average particle size of calcium carbonate used as a pigment was varied from 1.5 to 8.0 μm, but failed to find a specific range of pigment particle size that would satisfy the requirement under both the environmental conditions.

Testing was continued, assuming that incorporation of kaolin clay having a tabular crystal form or a structure built up by tabular crystals might be effective to improve slip properties for maintaining a proper absolute coefficient of paper-to-paper friction under both the environmental conditions.

Figure 2:
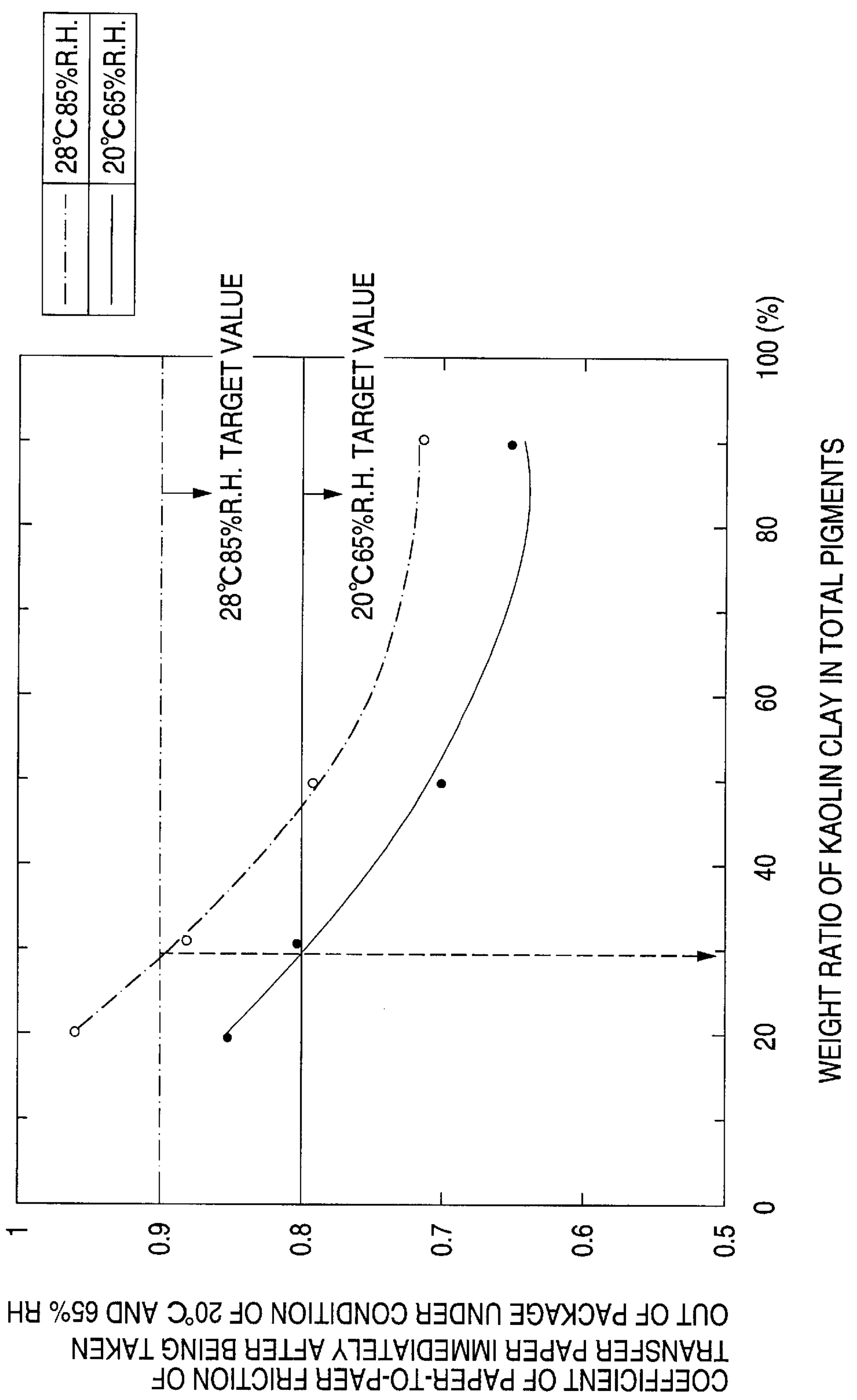
FIG. 2 is a graph showing the relationship between weight ratio of kaolin clay in total pigments (kaolin clay having an average particle size of 0.3 μm and precipitated calcium carbonate having an average particle size of 4.0 μm; pigment to binder weight ratio=50:50) and coefficient of paper-to-paper friction of transfer paper immediately after being taken out of the package under conditions of 20° C. and 65% RH.
Figure 3:
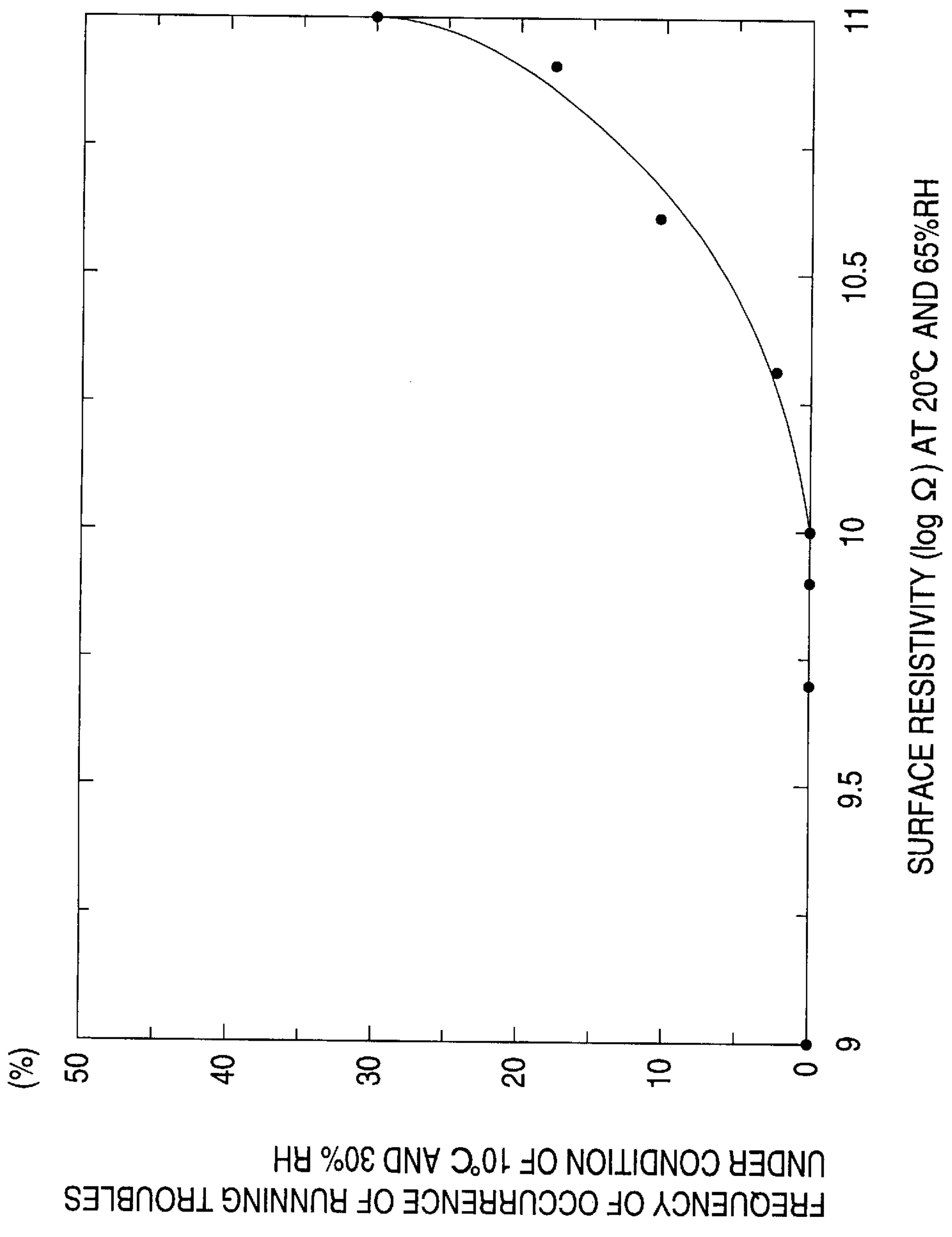
FIG. 3 is a graph showing the relationship between surface resistivity and frequency of occurrence of running troubles under conditions of 10° C. and 30% RH. The frequency of occurrence of running troubles was obtained from the number of occurrences of paper jamming per 1000 passes on a copying machine A-Color 636 (manufactured by Fuji Xerox Co., Ltd.) each for 8 kinds of transfer paper having a surface resistivity varying from $1\times10^9$ to $1\times10^{11}$ Ω.

It has been found as a result that incorporation of kaolin clay in a proportion of not less than 30% by weight based on the total pigment reduces the absolute coefficient of paper-to-paper friction, thereby assuring satisfactory running properties under both the environmental conditions, as shown in FIG. 2. If the proportion of kaolin clay exceeds 90% by weight, the image quality is reduced. Accordingly, kaolin clay is preferably used in a proportion of 30 to 90% by weight based on the total pigment.

If kaolin clay added has an average particle size of less than 0.3 μm, paper dust increases. If it exceeds 2.0 μm, the absolute coefficient of paper-to-paper friction increases. Accordingly, kaolin clay to be added should have an average particle size of 0.3 to 2.0 μm.

On the other hand, a binder is used for adhering the pigment to the surface of paper. Unless the amount of the binder used is proper, the above-specified air permeability for improvement of running properties at 28° C. and 85% RH cannot be obtained. According to the inventors' study, a proper air permeability can be obtained by using a binder in a proportion of not more than 70% by weight based on the sum of the pigment and the binder. If the weight proportion of a binder is too small, the surface strength of the coating layer is reduced, resulting in fall-off of the pigment on contact with the members of a copying machine or adhesion of the pigment to the paper feed members, which also leads to running troubles. Accordingly, it is important to use at least 30% by weight of a binder based on the sum of the binder and the pigment.

Then, the inventors investigated the cause of running troubles which occur in a low temperature and low humidity environment (10° C., 30% RH). For the sake of confirmation, various types of coated transfer paper were experimentally made to run under conditions of 10° C. and 30% RH, and some types were found stopped from running within a copying machine. The paper in a jam was observed to be electrostatically adhered to the metallic part of the copying machine. It is assumed from the observation that paper having a high surface resistivity would be triboelectrified on contact with a metallic material in a copying machine, electrostatically adhered thereto, and stopped from running.

Based on the above assumption, the inventors examined the relationship between running properties of transfer paper and its surface resistivity. The results revealed that running troubles are apt to occur if the surface resistivity exceeds $1\times10^{10}$ Ω as measured at 20° C. and 65% RH. However, if the surface resistivity is lower than $1\times10^9$ Ω, a toner cannot be transferred sufficiently in a high humidity condition, resulting in deterioration of image quality. Accordingly, the surface resistivity at 20° C. and 65% RH is preferably adjusted from $1\times10^9$ to $1\times10^{10}$ Ω.

Because image characteristics are of extreme importance for full-color copies, the coating layer of coated transfer paper should be controlled in terms of not only pigment composition and particle size but the surface properties. In the present invention, the transfer paper preferably has an Oken's smoothness of 60 to 300 seconds on each side thereof. Paper whose surface smoothness is less than 60 seconds has irregular and coarse voids on the surface thereof, which tend to cause cutting of a line image or a dot image at the time of transfer or fixing. As a result, the line image or dot image tends to become irregular, and fine unevenness of gloss or density tends to appear. If the Oken's smoothness exceeds 300 seconds, the transferred toner image, on being melt-fixed, hardly penetrates into the coating layer but spreads horizontally on the coated surface and partly joins the neighboring lines or dots to cause image noises. Besides, such transfer paper tends to undergo blocking at high humidity.

Further-details of the present invention will be given below.

In the present invention, the Oken's smoothness was measured in accordance with a method defined in JAPAN TAPPI No. 5, the air permeability was measured in accordance with a method defined in JISP8117.

The coefficient of paper-to-paper friction was measured in accordance with J. TAPPI No. 30 to 39 as follows. For sample pieces, used was about 30 sheets of paper in A3 size just after opening its package under a condition that it was still piled each other. A weight for the measurement was 240 g in weight, 63 mm in width and 75 mm in length. 20 sheets of paper were continuously measured in its longitudinal direction at 28° C., 85%RH and 20° C., 65%RH. Movement speed of the weight at this time was set to 150 mm/min. Coefficient of static friction measured by this method was an absolute value of the coefficient of paper-to-paper friction. Difference between absolute values of nth paper and (n+1)th paper was recognized as its change.

In the present invention, the surface resistivity was measured in accordance with JISK6911 in which an insulation layer is provided between a back surface electrode and the sample.

The base paper which can be used in the present invention is not particularly limited. Usable base paper includes conventionally known acidic or neutral woodfree paper or mechanical paper, woody paper, and recycled paper.

Fillers which can be used in the base paper are not particularly limited. Examples of suitable fillers include inorganic fillers, such as calcium carbonate including ground calcium carbonate, precipitated calcium carbonate, and chalk, and silicates, such as kaolin, calcined clay, pyrophyllite, sericite, and talc, and titanium dioxide; and organic fillers, such as urea resins and styrene. Calcium carbonate is preferred for image quality maintenance in electrophotography and for improvement in brightness.

Internal sizing agents to be used in the base paper are not particularly limited and include a rosin sizing agent, a synthetic size, a petroleum resin sizing agent, and a neutral sizing agent. The sizing agent may be used in combination with an appropriate for a size and fibers, such as aluminium sulfate or cationic starch.

The base paper may further contains strengthening agents, dyes, pH adjusting agents, and the like.

For the purpose of adjusting the resistivity of the base paper, organic or inorganic substances, such as sodium chloride, potassium chloride, calcium chloride, sodium sulfate, zinc oxide, titanium dioxide, tin oxide, aluminum oxide, magnesium oxide, alkylphosphates, alkylsulfates, sodium sulfonates, and quaternary ammonium salts, can be used either singly or as a combination thereof.

The binder which used in the coating layer is selected from water-soluble binders, emulsions or latexes which exhibit high binding properties for the base paper, pigments and other additives, either alone or as a combination thereof. Suitable binders include water-soluble resins, such as polyvinyl alcohol (PVA), modified PVA, starch derivatives (e.g., oxidized starch, esterified starch and etherified starch), gelatin, casein, methyl cellulose, hydroxyethyl cellulose, acrylic resins (e.g., acrylamide/acrylic ester copolymers, acrylamide/acrylic acid/methacrylic acid terpolymers, and styrene/acrylate resins), isobutylene/maleic anhydride resins, and carboxymethyl cellulose; acrylic emulsions, vinyl acetate emulsions, vinylidene chloride emulsions, polyester emulsions, styrenebutadiene latexes, and acrylonitrile/butadiene latexes. In order to maintain satisfactory running properties at high humidity, it is recommended to use starch binders and/or acrylic binders in an amount of at least 20% by weight based on the total binders of the coating layer.

In addition, the coating composition for the coating layer may contain dyes or colored pigments for color tone adjustment or fluorescent dyes for improvement of visual brightness. The coating composition may further contain known materials used in the base paper for adjustment of surface resistivity. Various other additives, such as dispersants, defoaming agents, plasticizers, pH adjusting agents, lubricants, fluidity modifiers, solidification accelerators, waterproofing agents, and sizing agent, may be added to the composition according to the necessity.

The coating composition can be applied to base paper by means of out-of-line coating machines, such as a blade coater, an air knife coater, a roll coater, a bar coater, a reverse-roll coater, a gravure coater, and a curtain coater, or in-line coating machines, such as a gate roll coater and a size press coater.

Smoothing treatment after coating can be carried out by means of a calender, a super calender, etc. to such a degree that the coating layer after drying may have an Oken's smoothness of 60 to 300 seconds as specified in the present invention.

While not limiting, the base paper of the transfer paper according to the present invention preferably has a basis weight of 64 to 110 g/m$^2$. Transfer paper whose base paper has a basis weight exceeding 110 g/m$^2$ requires excessive heat capacity on fixing and tends to fail to melt a toner uniformly and sufficiently, resulting in melt unevenness, which would lead to unevenness of gloss or density in high image density area or fixing deficiency. Further, such transfer paper is too stiff and tends to cause running disorders. If the basis weight of the base paper is less than 64 g/m$^2$, a toner tends to be excessively melted on fixing so that non-uniformity of penetration cannot be avoided completely even with manipulations on the coating layer structure, resulting in deterioration of graininess or increase of gloss unevenness.

The brightness of the transfer paper is not particularly limited but, for exhibition of satisfactory full-color image characteristics, is preferably not less than 80%, particularly not less than 82%, in terms of brightness by Hunter. If the brightness is less than 80%, saturation and brightness of color images are reduced to reduce color reproducibility.

In order to prevent waving of the transfer paper or curling after copying, it is preferable to adjust the water content of the transfer paper so that the transfer paper immediately after opening the package may have a water content of from 4.0 to 6.5% by weight. The product is preferably packaged in a moistureproof packaging material such as polyethylene-laminated paper or polypropylene so as to prevent absorption or desorption of moisture during storage.

The present invention will now be illustrated in greater detail with reference to Examples, but it should be understood that the present invention is not limited thereto. Unless otherwise indicated, all the percents and parts are by weight. In Examples and Comparative Examples, the term "smoothness" means "Oken's smoothness" which was measured according to JAPAN TAPPI No. 5 after the pretreatment specified in JIS P8111, the air permeability was measured according to JIS P8117, and a surface resistivity was measured according to JIS P6911 after the pretreatment specified in JIS P8111.

EXAMPLE 1

Commercially available neutral paper having a basis weight of 64.0 g/m$^2$ and an apparent density of 0.83 g/cm$^3$ was coated with NaCl so as to have a surface resistivity of 1×10$^9$ Ω to prepare a base. In 100 parts of water was dissolved 0.05 part of sodium polyphosphate, and 10 parts of precipitated calcium carbonate having an average particle size of 8.0 μm (a product of Shiraishi Kogyo K.K.) and 90 parts of kaolin having an average particle size of 0.3 μm were dispersed therein.

The resulting pigment dispersion was mixed with (a) oxidized starch (Oji Ace A, produced by Oji Corn Starch Co., Ltd.) and (b) a styrene-butadiene rubber latex (SBR) (JSR-0668 produced by Japan Synthetic Rubber Co., Ltd.) as binders at an (a)/(b) weight ratio of 20:80 to prepare a coating composition having a pigment to total binder weight ratio of 30:70.

The coating composition was applied to each side of the base at a single spread of 2 g m$^2$ on a solid basis, and the coated paper was subjected to calendering to obtain transfer paper having the characteristics shown in Table 1.

In Table 1, the average particle size (diameter) of the pigment is the one measured with a Coulter counter. The calcium carbonate ($CaCO_3$)/kaolin weight ratio is the one calculated based on the composition of the coating composition.

The pigment content in a sample can be measured by scraping off the coating layer, subjecting the scraped coating layer to an appropriate treatment, such as ashing, and analyzing by elemental analysis.

Test on Running Properties:

The running test of the resulting transfer paper was carried out on a digital color copying machine A-Color 635 manufactured by Fuji Xerox Co., Ltd. at 28° C. and 85% RH, 20° C. and 65% RH, and 10° C. and 30% RH. Immediately after being taken out of the package, transfer paper was put on a paper feed tray and made to run on the copying machine continuously to obtain 100 copies. The running properties were evaluated from the frequency of occurrence of running troubles (the number of running troubles/100 passes). A frequency of 1% or less was graded "A", 1 to 5% "B", and 6% or more "C".

Image Formation Test:

2 cm×2 cm patches having an image area ratio stepwise increasing from 10 to 100% by 10% were printed in yellow, magenta, cyan, red, green, blue, or mixed black (color mixture of yellow, magenta, and cyan) on the transfer paper and fixed by use of A-Color 635.

The patches of every color having an image area ratio of 20%, 30%, and 40% were observed with the naked eye to evaluate graininess in the middle tone. The patches of every color having an image area ratio of 50 to 100% were observed with the naked eye to evaluate unevenness of gloss and density in the middle tone to high density area. The graininess, unevenness of gloss, and unevenness of density as observed were graded "A" to "D" according to the following standards. An image graded "B" or better in every item of evaluation was overall judged "good", an image graded "C" in one or more of the items was overall judged "medium", and an image graded "D" in one or more of the items was overall judged "bad". A sample which was observed to have any apparent image defect besides the above items of evaluation was also judged "bad".

Standards for evaluation are shown below.

Graininess in Middle Tone:

A . . . Satisfactory

B . . . Feeling very slightly rough

C . . . Feeling slightly rough

D . . . Feeling appreciably rough

Unevenness of Gloss in High Density Area:

A . . . Satisfactory

B . . . Very slight unevenness of gloss observed

C . . . Slight unevenness of gloss observed

D . . . Appreciable unevenness of gloss observed

Unevenness of Density in Middle Tone to High Density Area:

A . . . Satisfactory

B . . . Very slight unevenness of density observed

C . . . Slight unevenness of density observed

D . . . Appreciable unevenness of density observed

The results of evaluation on running properties and overall image quality are shown in Table 1 below. As is apparent from Table 1, the transfer paper of Example 1 show excellent running properties on a copying machine irrespective of the environment of use and provides a high quality toner image.

EXAMPLE 2

Commercially available neutral paper having a basis weight of 68.0 g/m$^2$ and an apparent density of 0.81 g/cm$^3$ was coated with NaCl so as to have a surface resistivity of 5×10$^9$ Ω to prepare a base.

In 100 parts of water was dissolved 0.05 part of sodium polyphosphate, and 70 parts of precipitated calcium carbonate having an average particle size of 7.0 μm and 30 parts of kaolin having an average particle size of 2.0 μm were dispersed therein. The resulting pigment dispersion was mixed with (a) oxidized starch (Oji Ace A), (b) a styrene-acrylic emulsion (Primal B-85, produced by Rohm & Haas Japan), and (c) a styrene-butadiene latex (JSR-0668) as binders at an (a)/(b)/(c) weight ratio of 40:20:40 to prepare a coating composition having a pigment to total binder weight ratio of 70:30.

The coating composition was applied to each side of the base at a single spread of 10 g/m$^2$ on a solid basis, and the coated paper was subjected to calendering to obtain transfer paper having the characteristics shown in Table 1 below.

The resulting coated transfer paper was evaluated in terms of running properties and image quality in the same manner as in Example 1. The results obtained are shown in Table 1. It is seen that the transfer paper of Example 2 has excellent running properties on a copying machine irrespective of the environment of use and provides a toner image of satisfactory quality.

EXAMPLE 3

Commercially available neutral paper having a basis weight of 81.0 g/m$^2$ and an apparent density of 0.81 g/cm$^3$ was coated with NaCl so as to have a surface resistivity of 8×10$^9$ Ω to prepare a base.

In 100 parts of water was dissolved 0.05 part of sodium polyphosphate, and 60 parts of precipitated calcium carbonate having an average particle size of 2.0 μm and 40 parts of kaolin having an average particle size of 1.5 μm were dispersed therein. The resulting pigment dispersion was mixed with (a) a styrene-acrylic emulsion (Primal B-60A, produced by Rohm & Haas Japan) and (b) a styrene-butadiene rubber latex (JSR-0617, produced by Japan Synthetic Rubber Co., Ltd.) as binders at an (a)/(b) weight ratio of 50:50 to prepare a coating composition having a pigment to total binder weight ratio of 60:40.

The coating composition was applied to each side of the base at a single spread of 12 g/m$^2$ on a solid basis, and the coated paper was subjected to calendering to obtain transfer paper having the characteristics shown in Table 1 below.

The resulting coated transfer paper was evaluated in terms of running properties and image quality in the same manner as in Example 1. The results obtained are shown in Table 1. It is seen that the transfer paper of Example 3 has excellent running properties on a copying machine irrespective of the environment of use and provides a toner image of satisfactory quality.

EXAMPLE 4

Commercially available neutral paper having a basis weight of 85.0 g/m$^2$ and an apparent density of 0.82 g/cm$^3$ was coated with NaCl so as to have a surface resistivity of 3×10$^9$ Ω to prepare a base.

In 100 parts of water was dissolved 0.05 part of sodium polyphosphate, and 50 parts of precipitated calcium carbonate having an average particle size of 6.0 μm and 50 parts of kaolin having an average particle size of 1.0 μm were dispersed therein. The resulting pigment dispersion was mixed with (a) esterified starch (Petrocoat Z300, produced by Nichiden Kagaku K.K.), (b) a styrene-acrylic emulsion (Primal B-60A) and (c) a styrene-butadiene rubber latex (SBR) (JSR-0617) as binders at an (a)/(b)/(c) weight ratio of 30:50:20 to prepare a coating composition having a pigment to total binder weight ratio of 50:50.

The coating composition was applied to each side of the base at a single spread of 7 g/m$^2$ on a solid basis, and the coated paper was subjected to calendering to obtain transfer paper having the characteristics shown in Table 1 below.

The resulting coated transfer paper was evaluated in terms of running properties and image quality in the same manner as in Example 1. The results obtained are shown in Table 1. It is seen that the transfer paper of Example 4 has excellent running properties on a copying machine irrespective of the environment of use and provides a toner image of satisfactory quality.

EXAMPLE 5

Commercially available neutral paper having a basis weight of 100.0 g/m$^2$ and an apparent density of 0.82 g/cm$^3$ was coated with NaCl so as to have a surface resistivity of 1×10$^{10}$ Ω to prepare a base.

In 100 parts of water was dissolved 0.05 part of sodium polyphosphate, and 20 parts of precipitated calcium carbonate having an average particle size of 4.0 μm and 80 parts of kaolin having an average particle size of 0.7 μm were dispersed therein. The resulting pigment dispersion was mixed with (a) esterified starch (Petrocoat Z300) and (b) a styrene-butadiene latex (SBR) (JSR-0617) as binders at an (a)/(b) weight ratio of 70:30 to prepare a coating composition having a pigment to total binder weight ratio of 40:60.

The coating composition was applied to each side of the base at a single spread of 3 g/m$^2$ on a solid basis, and the coated paper was subjected to calendering to obtain transfer paper having the characteristics shown in Table 1 below.

The resulting coated transfer paper was evaluated in terms of running properties and image quality in the same manner as in Example 1. The results obtained are shown in Table 1. It is seen that the transfer paper of Example 5 has excellent running properties on a copying machine irrespective of the environment of use and provides a toner image of satisfactory quality.

EXAMPLE 6

Commercially available neutral paper having a basis weight of 110 g/m$^2$ and an apparent density of 0.82 g/cm$^3$ was coated with NaCl so as to have a surface resistivity of 1×10$^{10}$ Ω to prepare a base.

In 100 parts of water was dissolved 0.05 part of sodium polyphosphate, and 70 parts of precipitated calcium carbonate having an average particle size of 1.5 μm and 30 parts of kaolin having an average particle size of 2 μm were dispersed therein. The resulting pigment dispersion was mixed with (a) a styrene-acrylic emulsion (Primal B-60A) and (b) a styrene-butadiene rubber latex (SBR) (JSR-0617) as binders at an (a)/(b) weight ratio of 70:30 to prepare a coating composition having a pigment to total binder weight ratio of 70:30.

The coating composition was applied to each side of the base at a single spread of 12 g/m$^2$ on a solid basis, and the coated paper was subjected to calendering to obtain transfer paper having the characteristics shown in Table 1 below.

The resulting coated transfer paper was evaluated in terms of running properties and image quality in the same manner as in Example 1. The results obtained are shown in Table 1. It is seen that the transfer paper of Example 6 has excellent running properties on a copying machine irrespective of the environment of use and provides a toner image of satisfactory quality.

TABLE 1

| | Example 1 | Example 2 | Example 3 | Example 4 | Example 5 | Example 6 |
|---|---|---|---|---|---|---|
| Basis Weight of Base Paper (g/cm$^2$) | 64.1 | 68.2 | 81.2 | 85.3 | 100.1 | 110.0 |
| Coating weight (g/m$^2$) | 2 + 2 | 10 + 10 | 12 + 12 | 7 + 7 | 3 + 3 | 12 + 12 |
| $CaCO_3$:Kaolin Clay Weight Ratio | 10:90 | 70:30 | 40:60 | 50:50 | 20:80 | 70:30 |
| Average Particle Size of $CaCO_3$ (μm) | 8.0 | 7.0 | 2.0 | 6.0 | 4.0 | 1.5 |
| Average Particle Size of Kaolin Clay (μm) | 0.3 | 2.0 | 1.5 | 1.0 | 0.7 | 2.0 |
| Weight Ratio of Binders* | Stc:SBR = 20:80 | Stc:SA:SBR = 40:20:40 | SA:SBR = 50:50 | Stc:SA:SBR = 30:50:20 | Stc:SBR = 70:30 | SA:SBR= 20:80 |
| Pigment/binder Weight Ratio | 30:70 | 70:30 | 60:40 | 50:50 | 40:60 | 70:30 |
| Coated Side Smoothness (sec) | 60 | 250 | 85 | 170 | 200 | 300 |
| Air Permeability (sec) | 10 | 70 | 85 | 50 | 20 | 90 |

TABLE 1-continued

| | Example 1 | Example 2 | Example 3 | Example 4 | Example 5 | Example 6 |
|---|---|---|---|---|---|---|
| Coefficient of Friction Immediately After Opening of Package: | | | | | | |
| 28° C., 85% RH | 0.6 | 0.8 | 0. 85 | 0.7 | 0.9 | 0.9 |
| 20° C., 65% RH | 0.4 | 0.75 | 0.7 | 0.6 | 0.8 | 0.8 |
| Surface Resistivity (Ω) | $1 \times 10^9$ | $5 \times 10^9$ | $8 \times 10^9$ | $3 \times 10^9$ | $1 \times 10^{10}$ | $1 \times 10^{10}$ |
| Frequency of Running Troubles: | | | | | | |
| 28° C., 85% RH | A | A | A | A | A | A |
| 20° C., 65% RH | A | A | A | A | A | A |
| 10° C., 30% RH | A | A | A | A | A | A |
| Overall Image Quality | good | good | good | good | good | good |

Note in Table 1:
Stc: Starch
SA: Styrene-acrylic emulsion
SBR: Styrene-butadiene rubber latex

COMPARATIVE EXAMPLE 1

Transfer paper having the characteristics shown in Table 2 below was prepared in the same manner as in Example 1, except for using a base prepared by treating the same base paper as used in Example 1 with NaCl to have a surface resistivity of $8 \times 10^8$ and using precipitated calcium carbonate having an average particle size of 1.0 μm. The resulting transfer paper was evaluated in the same manner as in Example 1. The results obtained are shown in Table 2.

COMPARATIVE EXAMPLE 2

Transfer paper having the characteristics shown in Table 2 below was prepared in the same manner as in Example 2, except for using a pigment dispersion containing 80 parts of precipitated calcium carbonate having an average particle size of 9.0 μm and 20 parts of kaolin having an average particle size of 2.5 μm. The resulting transfer paper was evaluated in the same manner as in Example 1. The results obtained are shown in Table 2.

COMPARATIVE EXAMPLE 3

Transfer paper having the characteristics shown in Table 2 below was prepared in the same manner as in Example 3, except for changing the pigment to binder weight ratio to 5:95 and intensifying the smoothing treatment to give an Oken's smoothness of 350 sec. The resulting transfer paper was evaluated in the same manner as in Example 1. The results obtained are shown in Table 2.

COMPARATIVE EXAMPLE 4

Transfer paper having the characteristics shown in Table 2 below was prepared in the same manner as in Example 4, except for using a base prepared by treating the same base paper as used in Example 4 with NaCl to have a surface resistivity of $3 \times 10^{10}$, increasing the coating weight to 14 $g/m^2$/side, and moderating the smoothing treating to give an Oken's smoothness of 50 sec. The resulting transfer paper was evaluated in the same manner as in Example 1. The results obtained are shown in Table 2.

COMPARATIVE EXAMPLE 5

Transfer paper having the characteristics shown in Table 2 below was prepared in the same manner as in Example 5, except for using a base prepared by treating the same base paper as used in Example 5 with NaCl to have a surface resistivity of $1 \times 10^{11}$, and changing the pigment to binder weight ratio to 20:80. The resulting transfer paper was evaluated in the same manner as in Example 1. The results obtained are shown in Table 2.

COMPARATIVE EXAMPLE 6

Transfer paper having the characteristics shown in Table 2 below was prepared in the same manner as in Example 6, except for changing the calcium carbonate to kaolin clay weight ratio to 5:95. The resulting transfer paper was evaluated in the same manner as in Example 1. The results obtained are shown in Table 2.

TABLE 2

| | Comparative Example No. | | | | | |
|---|---|---|---|---|---|---|
| | 1 | 2 | 3 | 4 | 5 | 6 |
| Basis Weight of Base Paper ($g/cm^2$) | 64.1 | 68.2 | 81.2 | 85.3 | 100.1 | 110.0 |
| Coating weight ($g/m^2$) | 2 + 2 | 10 + 10 | 12 + 12 | 14 + 14 | 3 + 3 | 12 + 12 |
| $CaCO_3$:Kaolin Weight Ratio | 10:90 | 80:20 | 40:60 | 50:50 | 20:80 | 5:95 |
| Average Particle Size of $CaCO_3$ (μm) | 1.0 | 9.0 | 2.0 | 6.0 | 4.0 | 1.5 |
| Average Particle Size of Kaolin (μm) | 0.3 | 2.5 | 1.5 | 1.0 | 0.7 | 2.0 |
| Weight Ratio of Binders* | Stc:SBR = 20:80 | Stc:SA:SBR = 40:20:40 | SA:SBR = 50:50 | Stc:SA:SBR = 30:50:20 | Stc:SBR = 70:30 | SA:SBR = 20:80 |
| Pigment/binder Weight Ratio | 30:70 | 70:30 | 5:95 | 50:50 | 20:80 | 40:60 |
| Coated Side Smoothness (sec) | 60 | 250 | 350 | 50 | 200 | 300 |
| Air Permeability (sec) | 25 | 70 | 300 | 100 | 120 | 200 |

TABLE 2-continued

| | Comparative Example No. | | | | | |
|---|---|---|---|---|---|---|
| | 1 | 2 | 3 | 4 | 5 | 6 |
| Coefficient of Friction Immediately After Opening of Package: | | | | | | |
| 28° C., 85% RH | 0.5 | 1.0 | 1.25 | 0.95 | 1.15 | 1.0 |
| 20° C., 65% RH | 0.4 | 0.85 | 1.05 | 0.8 | 0.95 | 0.8 |
| Surface Resistivity (Ω) | $1 \times 10^9$ | $5 \times 10^9$ | $8 \times 10^9$ | $3 \times 10^{10}$ | $1 \times 10^{11}$ | $1 \times 10^{10}$ |
| Frequency of Running Troubles: | | | | | | |
| 28° C., 85% RH | A | C | C | C | C | C |
| 20° C., 65% RH | A | B | C | A | C | A |
| 10° C., 30% RH | A | A | A | B | C | A |
| Overall Image Quality | bad | bad | bad | bad | good | bad |

Note:
*The abbreviations, Stc, SA, and SBR have the same meanings as in Table 1.

While the invention has been described in detail and with reference to specific embodiments thereof, it will be apparent to one skilled in the art that various changes and modifications can be made therein without departing from the spirit and scope thereof.

What is claimed is:

1. Electrophotographic transfer paper comprising base paper and a coating layer including a pigment and a binder, said coating layer being provided on at least one side of said base paper, wherein said transfer paper has an air permeability in a range of 10 to 90 seconds, a coefficient of paper-to-paper friction in a range of 0.5 to 0.9 at 28° C. and 85% relative humidity, wherein said pigment comprises calcium carbonate having an average particle size in a range of 1.5 μm to 8.0 μm, and wherein said transfer paper has a smoothness in a range of 60 to 300 seconds.

2. Electrophotographic transfer paper according to claim 1, wherein said transfer paper has a coefficient of paper-to-paper friction in a range of 0.4 to 0.8 at 20° C. and 65% relative humidity.

3. Electrophotographic transfer paper according to claim 1, wherein said coating layer has a solids content in a range of 2 to 12 g/m$^2$ per side.

4. Electrophotographic transfer paper according to claim 2, wherein said coating layer has a solids content in a range of 2 to 12 g/m$^2$ per side.

5. Electrophotographic transfer paper according to claim 1, wherein said pigment comprises calcium carbonate having an average particle size in a range of 1.5 to 8.0 μm and kaolin clay having an average particle size in a range of 0.3 to 2.0 μm at a weight ratio in a range of 10:90 to 70:30.

6. Electrophotographic transfer paper according to claim 5, wherein a pigment to binder weight ratio is in a range of 30:70 to 70:30.

7. Electrophotographic transfer paper according to claim 1, wherein said transfer paper has a surface resistivity in a range of $1\times10^9$ to $1\times10^{10}$ Ω at 20° C. and 65% relative humidity.

8. Electrophotographic transfer paper according to claim 2, wherein said transfer paper has a surface resistivity in a range of $1\times10^9$ to $1\times10^{10}$ Ω at 20° C. and 65% relative humidity.

9. Electrophotographic transfer paper according to claim 5, wherein said transfer paper has a surface resistivity in a range of $1\times10^9$ to $1\times10^{10}$ Ω at 20° C. and 65% relative humidity.

* * * * *

UNITED STATES PATENT AND TRADEMARK OFFICE

CERTIFICATE OF CORRECTION

PATENT NO. : 6,592,984 B1
DATED : July 15, 2003
INVENTOR(S) : Tsukasa Matsuda et al.

It is certified that error appears in the above-identified patent and that said Letters Patent is hereby corrected as shown below:

Title page,
Item [75] and before Item [*] Notice, insert:

-- [73] Assignee: Fuji Xerox Co., Ltd., Tokyo (JP)
New Oji Paper Co., Ltd., Tokyo (JP) --

Signed and Sealed this

Twenty-seventh Day of January, 2004

JON W. DUDAS
*Acting Director of the United States Patent and Trademark Office*